United States Patent [19]

Sticht

[11] Patent Number: 4,687,091

[45] Date of Patent: Aug. 18, 1987

[54] POSITIONING AND STOP DEVICE FOR WORKPIECE CARRIERS OF A CONVEYOR

[76] Inventor: Walter Sticht, Karl-Heinrich-Waggerl-Strasse 8, A-4800 Attnang-Puchheim, Austria

[21] Appl. No.: 695,796

[22] Filed: Jan. 28, 1985

[30] Foreign Application Priority Data

Feb. 6, 1984 [AT] Austria ............................. A 362/84

[51] Int. Cl.[4] ........................................... B65G 21/20
[52] U.S. Cl. ..................................... 198/345; 104/251; 104/252
[58] Field of Search ................... 198/345, 465.1, 465.2, 198/465.3, 803.1, 772, 463.6; 104/249, 250, 251, 252

[56]  References Cited

U.S. PATENT DOCUMENTS

| | | | |
|---|---|---|---|
| 2,672,675 | 3/1954 | Cross | 198/345 X |
| 3,017,983 | 1/1962 | Pietsch | 198/463.6 |
| 3,478,859 | 11/1969 | Krempel et al. | 198/465.2 X |
| 3,571,872 | 3/1971 | Van Den Kiebsom | 198/345 |
| 4,316,534 | 2/1982 | Cummins | 198/345 |
| 4,428,300 | 1/1984 | Ziegenfus et al. | 104/250 |
| 4,494,282 | 1/1985 | Ida et al. | 198/345 X |
| 4,515,264 | 5/1985 | Sticht | 198/465.2 |

FOREIGN PATENT DOCUMENTS 2416703 10/1975 Fed. Rep. of Germany ...... 198/345
3212272 10/1983 Fed. Rep. of Germany .
2118127 10/1983 United Kingdom ............. 198/465.2

Primary Examiner—Robert J. Spar
Assistant Examiner—Lyle Kimms
Attorney, Agent, or Firm—Kurt Kelman

[57] ABSTRACT

A device for positioning or stopping a workpiece carrier of a conveying device in which workpieces are fed to different work stations following each other in a conveying direction is provided. The workpiece carrier is provided with an external stop projecting therefrom transversely of the conveying direction and arranged to cooperate with a stop carrier element disposed outside the path of movement of the workpiece carrier and having a stop surface moveable into and out of the path of movement of the stop in the conveying direction. In one embodiment the stop carrier element is moveable transversely of the conveying direction and engages a stop below the workpiece carrier. In another embodiment the stop element comprises a rotary cylinder extending longitudinally of the conveying direction and having a generally helical slide track engaging a stop projecting laterally from the workpiece carrier. The slide track comprises alternate sections extending at right angles to the axis of rotation of the cylinder and intermediate sections extending obliquely whereby successive stops are formed by the alternate right angle sections.

11 Claims, 8 Drawing Figures

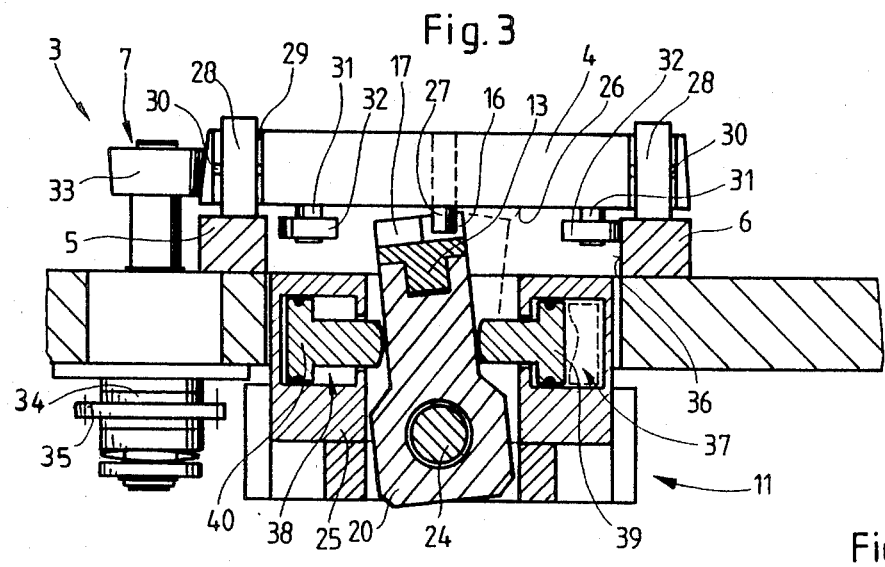
Fig. 3
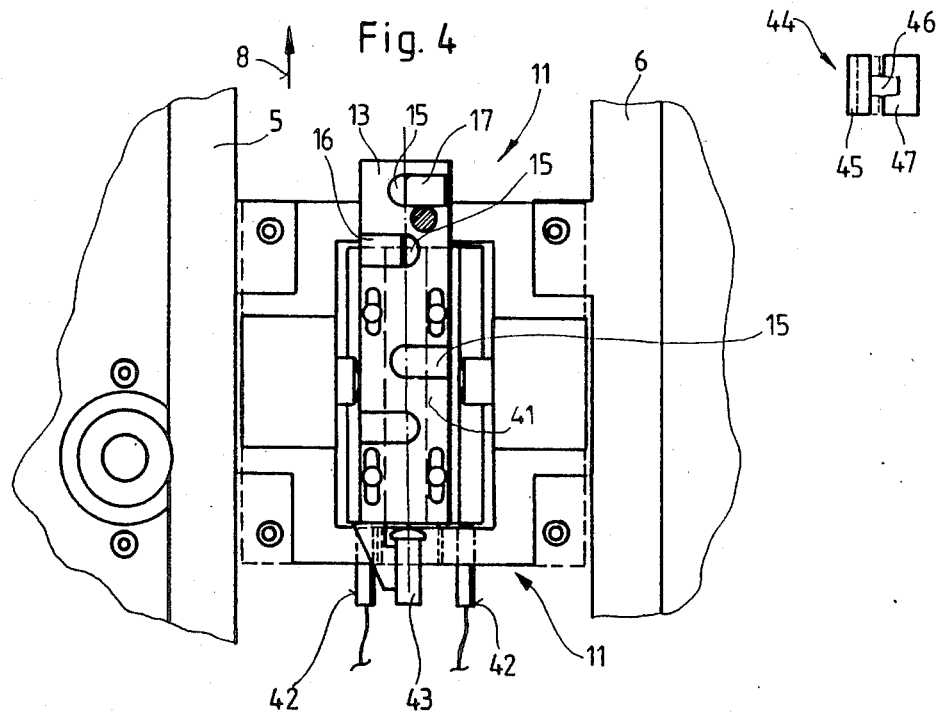
Fig. 4
Fig. 5

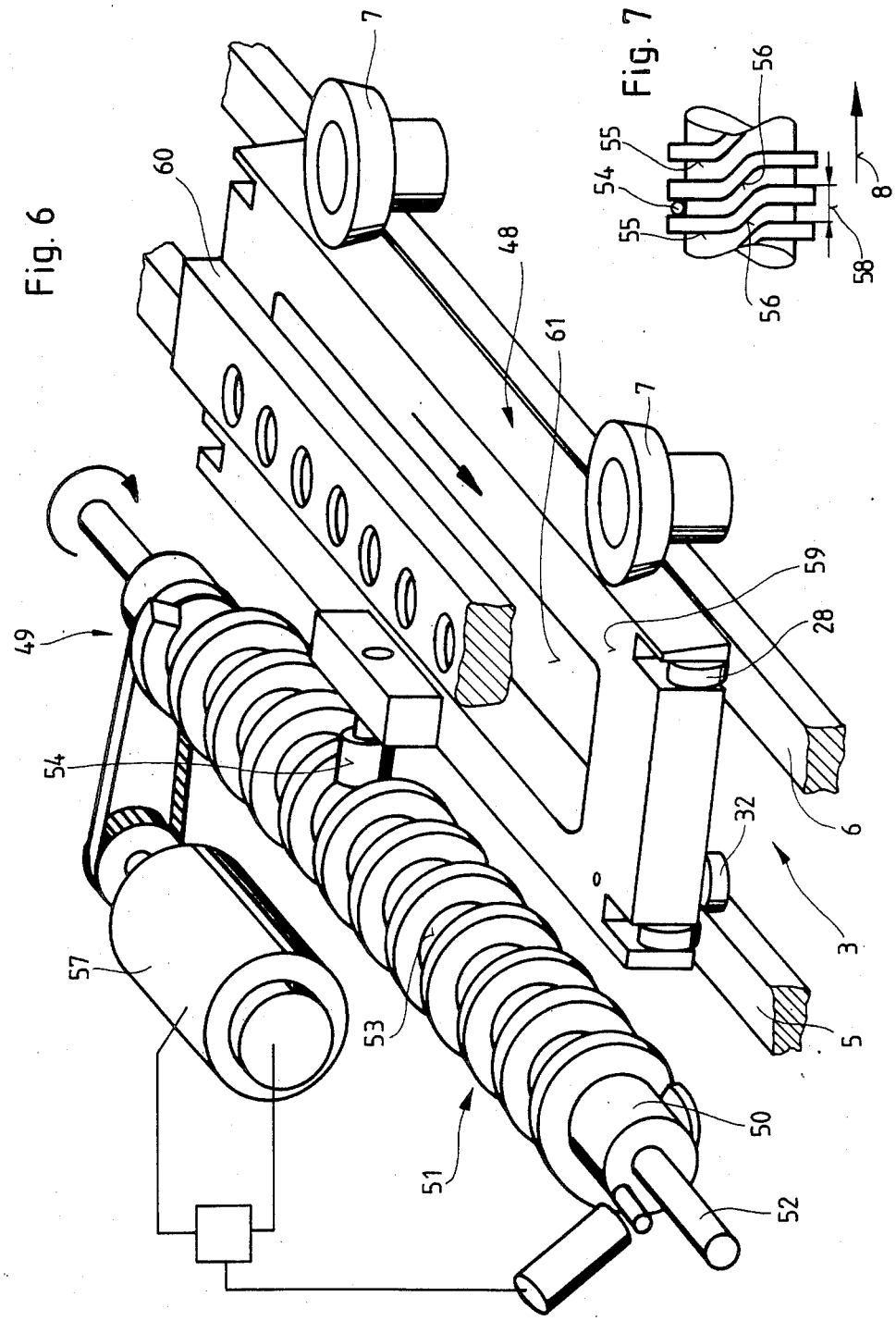

POSITIONING AND STOP DEVICE FOR WORKPIECE CARRIERS OF A CONVEYOR

BACKGROUND OF THE INVENTION

1. Field of the Invention

The invention relates to a device for positioning or stopping workpiece carriers of a conveyor device, in particular of a production plant for assembling workpieces comprising several individual parts, in which the workpieces are fed to different successive work processing stations by means of the conveyor device.

2. Description of Prior Art

Devices for positioning or stopping workpieces are already known—DE-OS No. 27 56 422 of the same applicant—in which stops mounted on the machine tables are allocated to the workpieces situated on the workpiece carriers. If required, these stops are displaceable within the cross-sectional area of the workpiece carriers displaced by means of the conveyor device, to stop the workpiece carriers in different positions. Furthermore, workpiece carriers were also disclosed which as combined conveying and positioning means comprise a pinion rotatably installed on the machine table which meshes with a toothed bar situated on a lateral surface of the workpiece carrier. Depending on the displacement of the pinion, the workpiece carrier also assumes a correspondingly preset position so that the workpieces on the workpiece carriers are positioned appropriately. These systems proved to be very satisfactory in practice, but could not fulfil all the requirements specified for them in many instances.

OBJECTS AND SUMMARY OF INVENTION

The present invention has a primary object of presenting a device for positioning and stopping workpiece carriers, which provides a positionally precise stopping of the workpiece carriers and may be installed in an uncomplicated manner. Furthermore, it should be possible to stop and position the workpiece carrier in several different positions in the area of the working or processing station by means of this positioning and stopping device.

In a device for positioning and stopping workpiece carriers of a conveying device in which workpieces are fed to different work stations following each other in a conveying direction according to the invention a workpiece carrier is provided with an external stop projecting therefrom transversely of the conveying direction and arranged to cooperate with a stop carrier element disposed outside the path of movement of the workpiece carrier and having a stop surface moveable into and out of the path of movement of the stop in the conveying direction.

In one embodiment the stop carrier element is moveable transversely of the conveying direction and suitably the stop surface is formed on a stop element removably mounted on the stop carrier element.

This problem of the invention is resolved in that the workpiece carriers are equipped with a stop projecting above their surface, which has allocated to it a stop carrier element situated outside the cross-sectional area of the workpiece or workpiece carrier and displaceable transversely to the conveying direction, which has a stop element displaceably mounted on it, the stop carrier element preferably being adjustably installed with respect to a plate carrier. The unexpected advantages of this inventive solution consist in that the required position of the workpiece carrier in each separate working or processing station may be preset to be different by application of adjustable stop elements even if the device for positioning or stopping at different working or processing stations is installed in one and the same installed position. Thanks to the displaceable mounting of the stop carrier element receiving the stop elements, it is possible to manage with one displacing element for several stop elements. Furthermore, it is advantageous that the possibility of displacing the stop carrier element provides an adjustability or precise setting of the stop elements at the corresponding stop positions.

It is advantageous moreover for the stop to project beyond the underside of the workpiece carrier and for the stop carrier elements to be constructed with several mounts for the exchangeably stop elements arranged one behind another in the conveying direction, and for the carrier element to be pivotally arranged around a pivot spindle aligned parallel to the conveying direction whereby it is possible by successive contradirectional pivotal displacement of the stop carrier element to place successively situated stop elements in active contact with the stop on the underside of the workpiece carrier. It is possible thereby to cycle workpiece carriers in individual working or processing stations.

According to a further aspect of the invention the stop elements which are arranged consecutively in the longitudinal direction of the stop carrier element are arranged to project in opposite directions from a central longitudinal axis of the stop carrier element and in particular for the mounts for the stop elements to be installed one behind another with uniform spacing in the conveying direction. Thanks to this construction, the stop elements do not foul the stop of the workpiece carrier during its onward displacement to the next stop element during continued operation.

The stop carrier element may be displaceably installed in a guideway of the carrier element and for adjustable means such as a screw-threaded spindle, to be incorporated with a stepping motor, a set screw or the like, and to be disposed between the stop carrier element and the carrier member, whereby it is possible to arrive at any optional position of the carrier member.

In accordance with the invention, the pivot spindle for the carrier member may suitably be installed in a housing of the positioning or stopping device, and for the carrier member to be associated with displacing drives, e.g. piston-cylinder systems, which are aligned and/or arranged at right angles to the pivot spindle and preferably in mirror symmetry with respect to each other, the terminal positions of the displacing drives simultaneously determining the pivotal terminal position of the carrier member. In a preferred embodiment, the displacing drives may simultaneously be utilised as terminal stops for always maintaining the same position of the stop carrier element.

According to another modified embodiment, provision is made for the stop carrier element and the carrier member to be situated between two guiding bars of a conveyor device for workpiece carriers which extend parallel to the pivot spindle of the carrier member, thereby eliminating lateral accelerations of the workpiece carrier by a central installation of the stop elements.

Advantageously, laterally with respect to one of the guiding bars, feed drives formed by friction drives, suitably by revolving friction rollers, which are coupled to a driving element, e.g. a conveyor chain, via a slip clutch are arranged to engage a side of the workpiece carrier. In an advantageous manner, this causes a positive contact of the stop of the workpiece carrier on the stop element and prevents rebounding of the workpiece carriers after the impingement of the stop on the stop elements, especially in the case of a high conveying speed.

Suitably a part of the stop element facing towards the workpiece carrier stop is connected to a supporting component of the stop element or to the stop carrier element by an elastic intermediate element, since this assures smooth braking of the workpiece carriers by means of the stop elements. A noise reduction is also secured thereby.

In an alternative embodiment the stop carrier element is constructed as a rotary cylinder or roller and the stop elements are formed by a continuous generally helical slide track cooperating with the stop, the helical slide track having alternative sections extending at right angles to the pivot spindle of the rotary roller and intermediate sections extending obliquely, and the distance between two sections of the slide track extending at right angles to the pivot spindle, or a multiple of the same, determining a specific processing position. This form of embodiment allows of a forward displacement of the workpiece carriers with tight interlinkage in a production plant operated with loose interlinkage, the length of the tight interlinkage conveying section being determined by the length of the rotary roller.

Furthermore, it is also possible however for the peripheral length of the section of the slide track extending at right angles to the axis of rotation of rotary roller, and the angular velocity of the rotary roller to be devised in a manner such that the processing period of a workpiece in a processing station may be determined, thereby rendering it superfluous to incorporate a complementary intermediate positioning operation.

It is advantageous moreover if the workpiece carrier has a carriage plate frame comprising an aperture situated in a central area and provided with rolling elements intended to rest on guiding bars of the conveyor device and rotatable around spindles which are horizontal and installed transversely to the conveying direction are installed in slots extending parallel to the direction of travel in ends of the frame extending transversely to the direction of travel, and also provided an underside with guiding elements rotatable around upright spindles, and which have a smaller spacing transversely to the direction of travel than the inwardly facing lateral guiding tracks of the guiding bars associated with them, since it is possible thereby to produce a massive workpiece carrier carriage frame which allows of torsion-free and precise guiding of the workpiece and of dimensionally precise positioning.

It is advantageous if a workpiece carrier plate is releasably and adjustably secured on the carriage plate frame, whereby the workpiece carrier carriage frames may be utilised for any optional form of a workpiece and merely the workpiece carrier plate need be adapted to the different workpieces.

BRIEF DESCRIPTION OF THE DRAWINGS

The invention will now be described, by way of example, with reference to the accompanying partly diagrammatic drawings, in which:

FIG. 3 is a cross-sectional view on an enlarged scale of the device for positioning and stopping, taken along the lines III—III in FIG. 1, FIG. 4 is a plan view of the device of FIGS. 2 and 3, FIG. 5 is a plan view of another embodiment of a stop element, FIG. 6 is a perspective view of a further embodiment of a device for the positioning and stopping of workpiece carriers with a stop carrier element constructed as a rotary roller, FIG. 7 is a fragmentary plan view of part of the rotary roller of the device of FIG. 6.

DETAILED DESCRIPTION OF PREFERRED EMBODIMENTS

Figure 1:
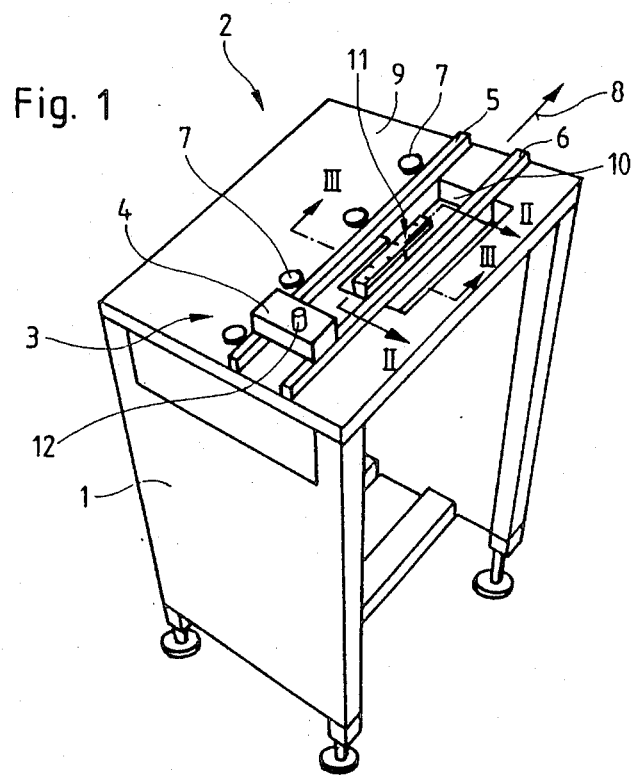
FIG. 1 is a perspective view from above of a working or processing station of a production plant comprising a device installed in the area of a conveyor device, for positioning and stopping the workpiece carriers conveyed by the conveyor device.

A machine table 1 of a work processing station 2 of a production plant is illustrated in FIG. 1. A conveyor device 3 for workpiece carriers 4 and which comprises guiding bars 5,6 and feed drives 7 is situated on the machine table. The workpiece carriers 4 are conveyed by means of the feed drives 7 in a conveying direction indicated by an arrow 8. A recess 10 wherein is installed the device 11 according to the invention for the positioning and stopping of the workpiece carriers is provided between the two guiding bars 5,6 in a table plate 9 of the machine table 1, in the working area of the work processing station 2. The workpiece carrier 4 may be stopped and positioned at the same time by means of the device 11, so that a workpiece 12 arranged on the workpiece carriers 4 is always placed in precisely the same position after the workpiece carrier 4 is stopped by the device 11.

Figure 2:
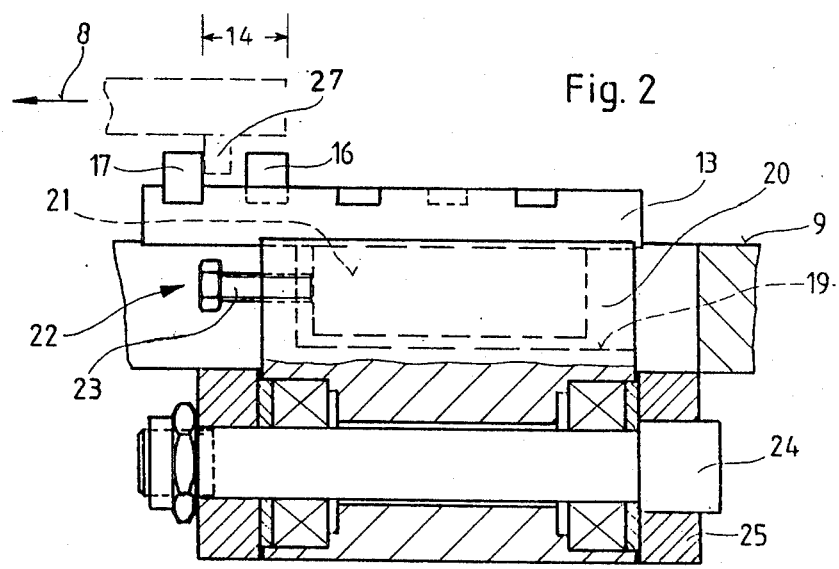
FIG. 2 is a sideview on an enlarged scale of the device according to the invention for the positioning and stopping of the workpiece carrier, partially in cross-section along the lines II—II in FIG. 1.

The device 11 is illustrated on an enlarged scale in FIGS. 2 to 4. As apparent, several mounting recesses 15 are formed on a stop carrier element 13 with a particular spacing 14 in the conveying direction indicated by arrow 8. Stop elements 16,17 which are allocated to a stop 27 of a workpiece carrier 4 illustrated in broken lines in FIG. 2, are inserted in two of the mounting recesses 15.

The stop carrier element 13, with the stop elements 16,17 mounted thereon, is guided in a guideway 19 of a carrier member 20 by means of a guiding block 21 in the conveying direction—arrow 8. A displacing device 22, exemplified by a set screw 23, is supported on the carrier memeber 20 to adjust the guiding block 21 in the conveying direction 8.

The carrier member 20 is rotatably journalled on a pivot spindle 24 which is secured in a lower housing 25 of the device 11 and extends parallel to the conveying direction 8.

As apparent, the arrangement is such that merely the stop element 13 projects above the upper surface of the table plate 9, whereas the housing 25 containing the pivot spindle 24 and the carrier member 20 are situated beneath or within the thickness of the table plate 9, so that the space for erection of handling and assembling devices on the upper surface of the table plate 9 is substantially unobstructed by the device 11 for the positioning and stopping of the workpiece carriers 4.

The cooperation between the inventive device 11 and the workpiece carrier 4 or the conveyor device 3 is apparent from FIG. 3. The workpiece carrier 4 has the stop 27 arranged on and projecting below an underside 26 into the region of the stop elements 16,17. The carrier 4 is guided on the upper side of the guiding bars 5,6 via roller elements 28 which are rotably journalled on horizontally aligned spindles 30 in slots 29 at the opposite sides of the workpiece carrier 4. The underside 26 has rotatable guiding elements 32 mounted on upright spindles 31 for guiding engagement with inside faces of the guide bars 5,6.

At one side the carrier 4 engages feed drives 7 formed by friction rollers driven on upright spindles coupled to a conveyor chain 35 via a slip clutch 34. The friction rollers of the feed drives 7 thrust the carrier 4 laterally towards the guide bar 6 so that the guiding elements 32 at that side engage the inner side 36 of the guide bar 6 in play-free manner to assure a precise lateral position of the carrier 4 relative to the guide bars. Precise vertical positioning of the carrier 4 is assured by engagement of the roller elements 28 with the upper surfaces of the guide bars 5,6.

The positioning operation in the third axis, that is in the longitudinal direction of the conveyor device 3, occurs by means of the stop elements 16,17 which are situated on the stop carrier element 13. The stop carrier element 13 is displaced laterally above the carrier member 20, i.e. transversely of the conveying direction 8 of the workpiece carrier 4, by means of displacing drives which are formed by piston-cylinder systems 37,38. The pistons 39,40 of the piston-cylinder systems 37,38 simultaneously serve the purpose of setting the extreme positions of the carrier member 20.

The piston 40 of the piston-cylinder system 38 thus acts as a terminal stop in one lateral direction by contact on the housing 25 in the position of the carrier member 20 illustrated in solid lines, whereas the piston 39 acts as a terminal stop in the other lateral direction at the position of the carrier member 20 shown in broken lines. It is thereby accomplished in simple manner that the displacing drives 37,38 may be utilised at the same time as terminal and positioning stops for the carrier member 20 and hence the stop carrier element 13.

As apparent from FIG. 4, the mounting recesses 15 for the stop elements 16,17 are arranged staggered in opposed directions transversely of a central longitudinal axis 41 on the upper side of the stop carrier element 13. Facing sides of stop elements 16,17 inserted into the mounting recesses 15 are situated approximately on the central longitudinal axis 41 and the slight pivotal displacement of the carrier member 20 transversely to the direction of travel 8 is sufficient to place one or the other of the two stop elements 16,17, in contact with the stop 27. The stop elements 16,17 may be formed by metal blocks, plastics material blocks or the like.

To detect the momentary position of the carrier member 20, limit switches 42, e.g. electromagnetic proximity switches, reflected light sensors, mechanically operated switches and the like, are incorporated as indicated diagrammatically.

As shown in FIG. 4, one end of the stop carrier element 13 engages a shock absorber 45 on the carrier member 20 whereby the workpiece carrier 4 may be decelerated linearly or progressively to a halt upon the stop 27 striking a stop element 16 or 17, and a jolting impact on the device 11 may be averted. This is advantageous for the workpiece carriers 4 and the workpieces 12 situated thereon or for their individual parts, since prevention of jolting braking actions allows for entrainment of loose individual parts on the workpiece carrier 4, without running the risk of these dropping off the workpiece carrier 4 upon impact with the device 11.

A modified embodiment of stop element 44 is shown in FIG. 5, in which, a stop part 45 facing stop 27 in the conveying direction is supported on a complementary support component 47 by an elastic intermediate element 46. The distance between the stop part 46 and the component 47 may be selected as a function of the conveying speed of the conveyor device and may for example amount to a few tenths of a millimeter, to be sufficient to prevent a direct impact action when the workpiece carrier 4 halts upon striking the stop element 44. It is also possible to support the stop elements 16,17 on the stop carrier element 13 by elastic intermediate members, so that this jolt-free deceleration of the workpiece carrier is obtained by a movement between the stop elements 16,17 and the stop carrier element 13.

In the embodiment of FIG. 6, a device 49 for stopping or positioning is associated with a workpiece carrier 48 and is situated laterally offset with respect to the conveyor device 3 on an opposite side to the feed drives 7. The device 49 comprises a stop carrier element 51 constructed as a rotary roller 50 having a pivot spindle 52 which extends parallel to guiding bars 5,6 of the conveyor device 3 and the conveying direction. The rotary roller 50 is equipped with a helically encircling slide track 53 in which is engaged a stop 54 projecting from the workpiece carrier 48. The helical slide track 53 comprises alternate sections 55 extending at right angles to the axis of the pivot spindle 52 and intermediate sections 56 extending obliquely to the axis of the pivot spindle 52. The rotary roller 50 may be driven in rotation by means of a driving motor 57, suitably a stepping motor or the like. The successive sections 55,56 extending at right angles and obliquely to the pivot spindle 52 have the result that the workpiece carrier 4 is held fast in the same position during its engagement with a vertical section 55, whereas it is pushed forward in the conveying direction 8 during displacement along the sections 56 extending obliquely to the pivot spindle 52 by displacement of the stop 54 in the slide track 53. A precisely predetermined forward movement of the workpiece carrier 48 is thus secured in closely interlinked manner. With an appropriate length of the rotary roller 50, it is possible to convey several successively conveyed workpiece carriers 48 through a work processing station in a closely interlinked manner. The dwell period of the workpiece carriers 48 in individual working stations which correspond to the respective sections 55 of the slide track 53 which extend at right angles to the pivot spindle may be made proportional to the angular extent of the sections 55 and a function of the angular velocity of the rotary drive 57, or the drive motor 57 may be operated in a cyclic or stepped manner.

The feed value per feed cycle is determined by a spacing 58 between adjacent sections 55 i.e. the axial extent of an oblique section 56.

An apparent furthermore from FIG. 6 the workpiece carrier 48 comprises a carriage plate frame 59 wherein are installed the rolling elements 28 and guiding elements 32 as in the embodiments of FIGS. 1–4. The workpiece carriage plate frame 59 has placed on it a workpiece carrier plate 60 extending above a recess or aperture 61 formed in the plate frame 59. The workpiece carrier plate 60 is equipped, as shown diagrammatically, with reception bores, retainers or the like for reception of different individual parts in particular for assembling workpieces comprising several individual parts. The recess 61 in the workpiece carrier carriage plate frame assures that access from below to the workpiece or individual parts is assured to allow for processing operations which are required to be performed from below.

It is evidently possible within the scope of the invention to construct the stop carrier plate 13 or the carrier member 20 in a different appropriate manner. For example, it is possible to make use of rotary cylinders or of electromagnetically operated systems or the like, instead of the contradirectional piston-cylinder systems illustrated.

Furthermore, it is also possible however for two piston-cylinder systems having different strokes to be allocated to each side of the plate carrier, so that fourfold positioning is possible, so that for example in the case of large workpiece carriers and correspondingly large gaps between the guiding bars, it is possible to obtain advancing displacements which are smaller than the present minimum graduation between successive stop elements. Furthermore, it is also possible for the stop elements to be installed movably or retractably on the stop carrier element, so that it is not necessary to travel through all the stop settings depending on the nature of the workpiece carrier being conveyed.

Figure 8:
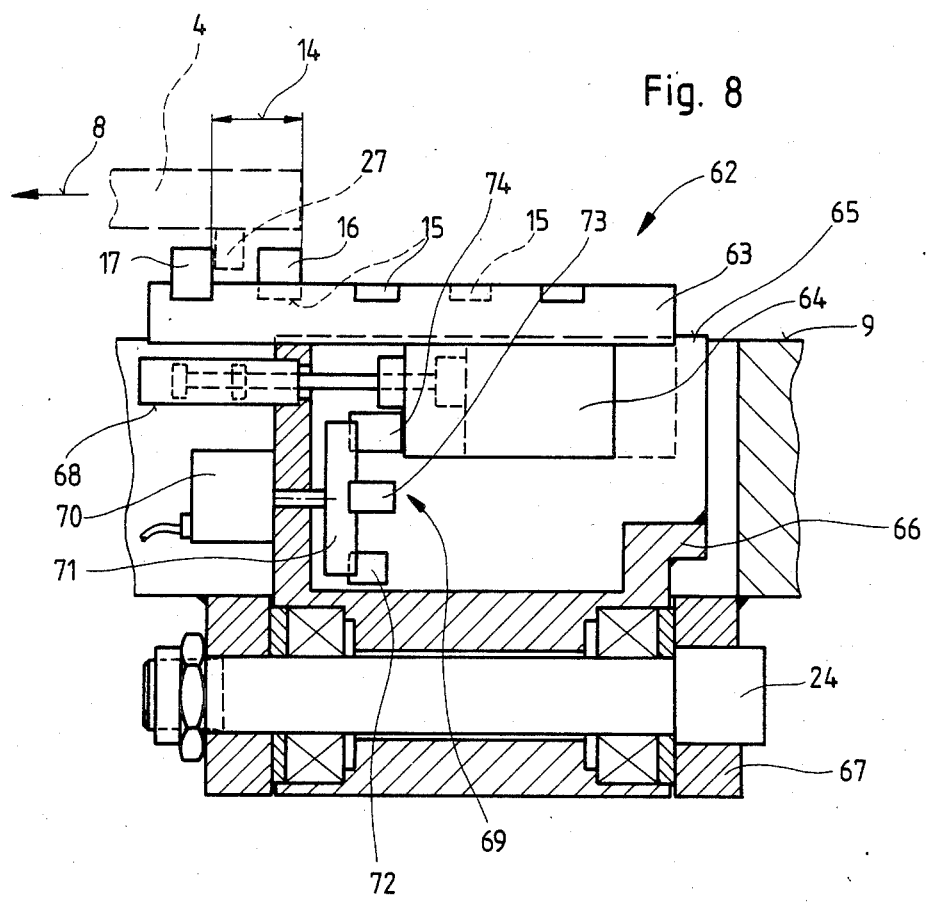
FIG. 8 is a fragmentary partially sectional side elevation of a yet further embodiment of a device for positioning and stopping the workpiece carriers.

A further embodiment of a device 62 for positioning and stopping workpiece carriers 4 is illustrated in FIG. 8. This has a stop carrier element 63 on which several mounts 15 for stop elements 16,17 are provided with a spacing 14 in the conveying direction, one behind another—arrow 8. These stop elements have allocated to them a stop 27 situated on the workpiece carrier 4, whereby the workpiece carrier 4 is positioned by bearing on the stop elements 16, 17. The top carrier element 63 is fastened on a guiding block 64 and is displaceable therewith in a slideway 65 of a plate carrier 66 in the conveying direction—arrow 8. The plate carrier 66 is pivotable around a pivot spindle 24 with respect to a housing 67 transversely to the conveying direction—arrow 8. The housing 67 is connected to the table plate 9.

The pivotal displacement of the plate carrier 66 may for example be performed as described with reference to FIGS. 2 and 3. The device 62 according to FIG. 8 differs from the embodiment in FIGS. 2 to 4 in that the guiding block 64 together with the stop carrier element 63 rigidly fastened thereon, is displaceable in the slideway 65 against the action of a shock absorber 68. Furthermore, the path of travel of the guiding block 64 has arranged in it another stop device 69 which comprises a plate 71 rotatable by means of a rotary drive 70, for example a stepping motor or a ratchet system. This plate 71 carries circumferentially arranged stops 72 to 74 whereby the guiding block 64 may be positioned at intermediate settings between the individual stop elements 16 and 17. It is possible thereby, as a departure from their preset constant spacing 14, to displace the stop elements 16 and 17 into intermediate positions by appropriate displacement of the plate 71 by means of the rotary drive 70. At the same time by means of the shock absorber 68, a damping action on the deceleration of the workpiece carrier 4 is assured in any position, since during a pivotal displacement of a stop element 16 or 17 out of the trajectory of the stop 27, the stop carrier element 63 is displaced into contact with the stop 27 by the action of the shock absorber 68 against the direction of travel—arrow 8—of the workpiece carrier 4, and the onward displacement or the stop displacement is decelerated or damped until the guiding block 64 comes into contact on one of the stops 72 to 74.

It will be understood from the foregoing that variations may be made in the form construction and arrangement of the parts without departing from the spirit and scope of the invention set out in the ensuing claims.

What is claimed is:

1. In a production plant for processing workpieces at successive work processing stations:
   (a) a workpiece carrier having a transverse cross-section and a surface extending perpendicularly thereto, the workpiece carrier having
      (1) a stop projecting from the surface outside the cross section of the workpiece carrier,
   (b) a conveyor device for conveying the workpiece carrier in a conveying direction extending substantially parallel to the workpiece carrier surface,
   (c) a stop carrier element disposed adjacent the conveyor device outside the cross section of the workpiece carrier and movable substantially transversely to the conveying direction, the stop carrier element defining
      (1) a plurality of mounting recesses arranged successively in the conveying direction,
   (d) means for substantially transversely moving the stop carrier element, and
   (e) at least one exchangeable stop element removing mounted in a respective one of the mounting recesses for cooperating with the workpiece carrier stop upon transverse movement of the stop carrier element for positioning and stopping the workpiece carrier at a respective one of the work processing stations.

2. In the production plant of claim 1, the successively arranged mounting recesses being equidistantly spaced in the conveying direction and extending in opposite directions from a central longitudinal axis of the stop carrier element.

3. In the production plant of claim 1, a carrier member for adjustably supporting the stop carrier element in the conveying direction.

4. In the production plant of claim 3, wherein the carrier member defines a guideway displaceably mounting the stop carrier element for movement in said direction, and a displacing device arranged for displacing the stop carrier element with respect to the carrier member.

5. In the production plant of claim 3, a pivot extending parallel to the conveying direction and pivotally supporting the carrier member for pivoting transversely to said direction.

6. In the production plant of claim 5, a housing wherein the pivot and respective displacing devices extending perpendicularly to the pivot at respective sides thereof are installed in the housing for engagement with the carrier member, terminal positions of the displacing devices defining respective terminal positions of the pivotal movement of the carrier member.

7. In the production plant of claim 5, the conveyor device comprising two guiding bars for the workpiece carrier extending parallel to the pivot and the stop carrier element and the carrier member being positioned between the guiding bars.

8. In the production plant of claim 7, the conveyor device comprising rotary friction rollers disposed laterally of one of the guiding bars for frictional engagement with the workpiece carrier, a driving element for the rotary friction rollers and a slip clutch coupling each rotary friction roller to the driving element.

9. In the production plant of claim 3, shock absorber means interposed between the carrier member and the stop carrier element for decelerating the movement of the workpiece carrier to a stop upon engagement of the workpiece carrier stop with the stop on the stop carrier element.

10. In the production plant of claim 1, the stop element comprising a stop part arranged to engage the workpiece carrier stop and an elastic element supporting the stop part on the stop element.

11. In the production plant of claim 1, the workpiece carrier being a rectangular carriage plate having four corners and defining slots at the four corners extending in the conveying direction, and the conveyor device comprising two guiding bars extending in the conveying direction and defining upper guiding tracks and lateral inwardly facing guiding tracks, rolling elements rotatably mounted in the slots on axes extending transversely to the conveying direction and engaging the upper guiding tracks of the guiding bars, and guiding elements arranged on an underside of the carriage plate in a plane parallel thereto and rotatable on axes extending perpendicularly thereto, the rotatable guiding elements having a smaller spacing transversely to the conveying direction than the lateral inwardly facing guiding tracks.

* * * * *